(12) United States Patent
Carey (10) Patent No.: US 12,476,844 B2
(45) Date of Patent: Nov. 18, 2025

(54) HYBRID MESH NETWORKING SYSTEM (71) Applicant: Trimble Inc., Westminster, CO (US)

(72) Inventor: Joseph Miles Carey, Longmont, CO (US)

(73) Assignee: Trimble Inc., Westminster, CO (US)

( * ) Notice: Subject to any disclaimer, the term of this patent is extended or adjusted under 35 U.S.C. 154(b) by 298 days.

(21) Appl. No.: 18/211,077

(22) Filed: Jun. 16, 2023

(65) Prior Publication Data

US 2024/0422030 A1   Dec. 19, 2024

(51) Int. Cl.
H04L 12/46 (2006.01)
H04W 84/18 (2009.01)

(52) U.S. Cl.
CPC ...... *H04L 12/4633* (2013.01); *H04L 12/4641* (2013.01); *H04W 84/18* (2013.01)

(58) Field of Classification Search
CPC . H04L 12/4633; H04L 12/4641; H04W 84/18
See application file for complete search history.

(56) References Cited

U.S. PATENT DOCUMENTS

| | | | |
|---|---|---|---|
| 2008/0112363 A1 | 5/2008 | Rahman et al. | |
| 2010/0260146 A1 | 10/2010 | Lu | |
| 2012/0011200 A1* | 1/2012 | Zhang | H04L 67/104 709/204 |
| 2017/0019375 A1 | 1/2017 | Garg et al. | |
| 2017/0180184 A1* | 6/2017 | Korotkov | H04L 63/0281 |
| 2018/0026811 A1* | 1/2018 | Herrero | H04L 65/1069 370/352 |
| 2019/0190887 A1 | 6/2019 | Yan | |
| 2022/0052876 A1* | 2/2022 | Qu | H04L 12/4641 |
| 2022/0286489 A1* | 9/2022 | Trussart | H04L 12/1859 |
| 2023/0083034 A1* | 3/2023 | Kondapavuluru | H04L 63/061 713/151 |
| 2024/0007388 A1* | 1/2024 | Haddad | H04L 12/4641 |
| 2024/0171484 A1* | 5/2024 | Muñoz De La Torre Alonso | H04L 43/062 |
| 2024/0195795 A1* | 6/2024 | Evans | H04L 9/3268 |
| 2024/0291803 A1* | 8/2024 | Tsirkin | H04L 63/0869 |

OTHER PUBLICATIONS

Extended European Search Report for Application No. 24181429.2-1215, mailed Oct. 24, 2024, 12 pages.

* cited by examiner

*Primary Examiner* — Andrew Lee
(74) *Attorney, Agent, or Firm* — Kilpatrick Townsend & Stockton LLP (57) ABSTRACT

A method for communicating between mesh networks comprising: establishing a first tunnel to bypass a firewall, the bypass enabled by encapsulating first packets between a first backhaul node of a first local mesh network and a server, the first backhaul node of the first local mesh network having internet connectivity and receiving the first packets addressed to a destination not reachable by the first local mesh network without internet connectivity to a second local mesh network; establishing a second tunnel between a second backhaul node of a second local mesh network and the server, wherein the second backhaul node of the second local mesh network has internet connectivity; receiving at the server the encapsulated first packets from the first backhaul node via the first tunnel; and transmitting from the server the received encapsulated first packets to the second backhaul node of the second local mesh network.

20 Claims, 6 Drawing Sheets

HYBRID MESH NETWORKING SYSTEM

BACKGROUND

This disclosure relates in general to mesh networks. Mesh networks allow for more than one device to act as a router, therefore enabling a group of devices to act as a network and potentially more than one route for a packet to optionally traverse through. Devices (nodes) of a mesh network may be capable of communicating with any other device that is part of the mesh network and within signal range. Thus, mesh networks are capable of providing connectivity between devices without the need for internet connectivity. Further, mesh network routing topology may change dynamically as devices join the mesh network, leave the mesh network, physically move, and/or have other routing factors change.

SUMMARY

This disclosure generally relates to communication between mesh networks.

In certain embodiments, a computer-implemented method is used for communicating between multiple mesh networks, the mesh networks including one or more nodes with one or more addresses, the method comprising: establishing a first tunnel, that enables bypassing a firewall, the bypass enabled by encapsulating first packets between a first backhaul node of a first local mesh network and a server, wherein the first backhaul node of the first local mesh network has internet connectivity and receives the first packets addressed to a destination address that is not reachable by the first local mesh network without internet connectivity to a second local mesh network; establishing a second tunnel to encapsulate second packets between a second backhaul node of a second local mesh network and the server to enable bypassing the firewall, the bypass enabled by encapsulating second packets between the second backhaul node of the second local mesh network and the server, wherein the second backhaul node of the second local mesh network has internet connectivity and receives the first packets addressed to the destination address that is not reachable by the first local mesh network without internet connectivity to the second local mesh network; receiving at the server the encapsulated first packets from the first backhaul node via the first tunnel, wherein the encapsulated first packets include a destination address that belongs to a mesh node in the second local mesh network; and responsive to receiving the encapsulated first packets from the first backhaul node: transmitting from the server the received encapsulated first packets to the second backhaul node of the second local mesh network, wherein the second local mesh network includes the mesh node having an address that corresponds to the destination address of the encapsulated first packets.

In some embodiments, a system for communicating between multiple mesh networks comprises a server configured to: receive encapsulated packets from a first backhaul node in a first local mesh network; and transmit, the received encapsulated packets to a second backhaul node in a second local mesh network, wherein the encapsulated packets have a destination address that corresponds to a node in the second local mesh network and wherein the encapsulated packets enable bypassing of a firewall of the second backhaul node. The system also comprises a set of local mesh networks, wherein the set of local mesh networks include at least the first local mesh network and the second local mesh network, wherein each of the first and second local mesh networks includes at least one backhaul node; each of the backhaul nodes configured to: transmit the encapsulated packets to the server; and receive the encapsulated packets from the server.

In some embodiments, a non-transitory processor-readable storage medium comprises processor-readable instructions configured to cause one or more processors to: establish a first tunnel, that enables bypassing a firewall, the bypass enabled by encapsulating packets between a first backhaul node of a first local mesh network and a server, wherein the first backhaul node of the first local mesh network has internet connectivity and receives one or more packets addressed to a destination address that is not reachable by the first local mesh network without internet connectivity to a second local mesh network; establish a second tunnel to encapsulate packets between a second backhaul node of a second local mesh network and the server to enable bypassing a firewall, the bypass enabled by encapsulating packets between the second backhaul node of a second local mesh network and the server, wherein the second backhaul node of the second local mesh network has internet connectivity and receives one or more packets addressed to a destination address that is not reachable by the first local mesh network without internet connectivity to a second local mesh network; receive encapsulated packets from the first backhaul node via the first tunnel, wherein the encapsulated packets include a destination address that belongs to a mesh node in the second local mesh network; and responsive to receiving the encapsulated packets from the first backhaul node: transmit the received encapsulated packets to the second backhaul node of the second local mesh network, wherein the second local mesh network includes a node with an address that corresponds to the destination address of the encapsulated packets.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

As used herein a "node" may communicate with other nodes to establish a network that enables communications and transfers across the network. Some nodes can receive, process, and/or forward data packets. Nodes may also perform other functions, such as data storage. Each node typically has a unique address or other identifier, such as an IP address, that allows it to be identified and located within a network. In the description below, a virtual server, backhaul node, local node, and mesh machine may be types of nodes.

Typically, mesh networks are designed and used for communication between nodes without the need for a single router and/or the internet. Thus, traditionally wireless mesh network nodes are not configured to communicate with other mesh network nodes over the internet and are therefore limited to communicating with nodes that are within range of the wireless signals used by devices of the mesh network. Embodiments described herein allow for the range of a mesh network to be extended, thereby allowing communication between mesh network nodes that may otherwise traditionally be out of communication range. Further, embodiments allow for enhanced reliability of communications between nodes of a mesh network by creating a hybrid mesh network.

Figure 1:
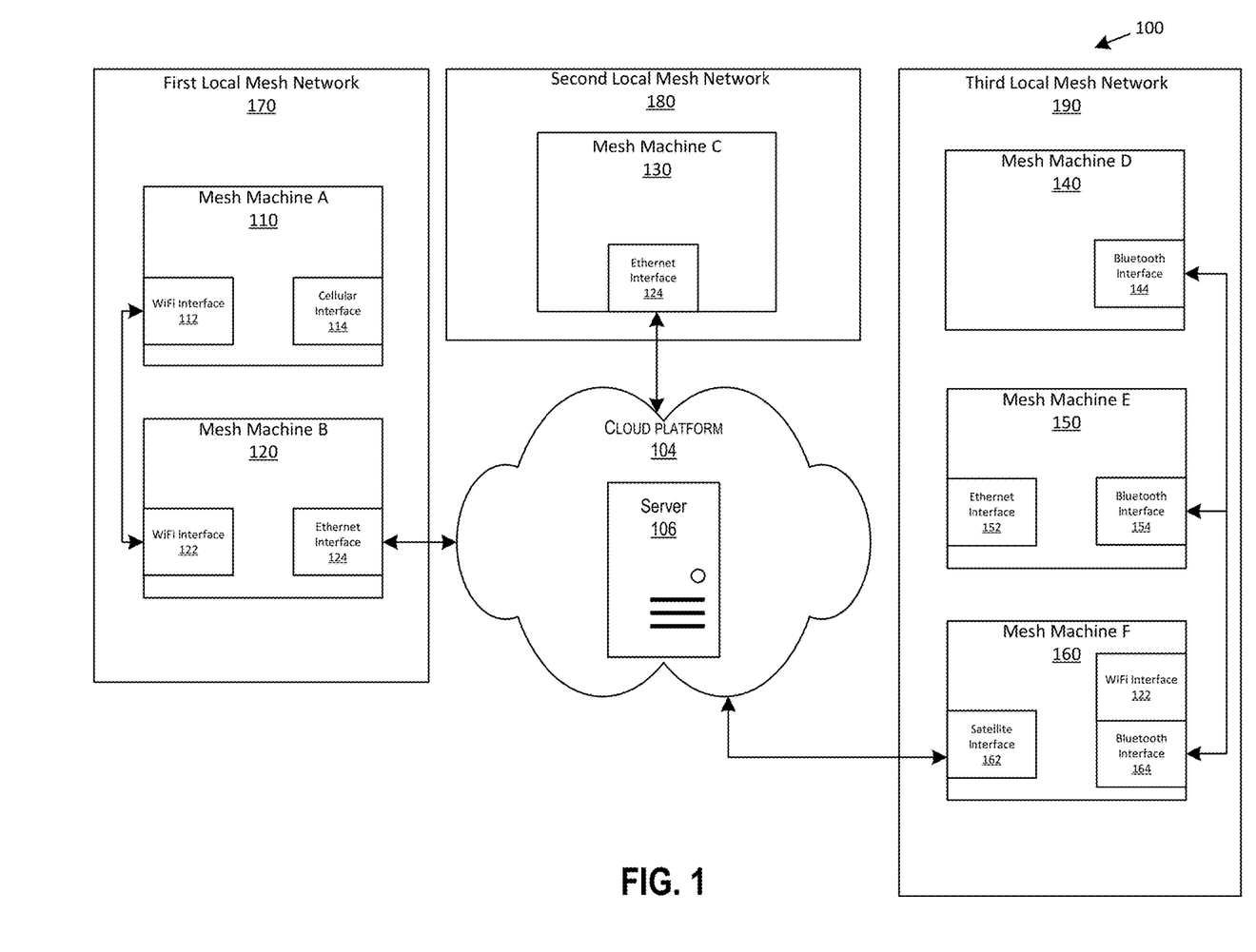
FIG. 1 illustrates a diagram of an embodiment system using a cloud platform to facilitate communication between mesh networks.

FIG. 1 illustrates a diagram of an embodiment system using a cloud platform to facilitate communication between mesh networks.

System 100 illustrates three local mesh networks, first local mesh network 170, second local mesh network 180, and third local mesh network 190. Each local mesh network may include one or more mesh machines (e.g., mesh machine A 110). Although three local mesh networks are shown in system 100, one of ordinary skill in the art with the benefit of this disclosure would recognize that any number of local mesh networks may be contained within such a system. This idea, as well as the idea that each local mesh network may contain at least one mesh machine and any number of additional mesh machines is further described in relation to FIG. 3.

Figure 3:
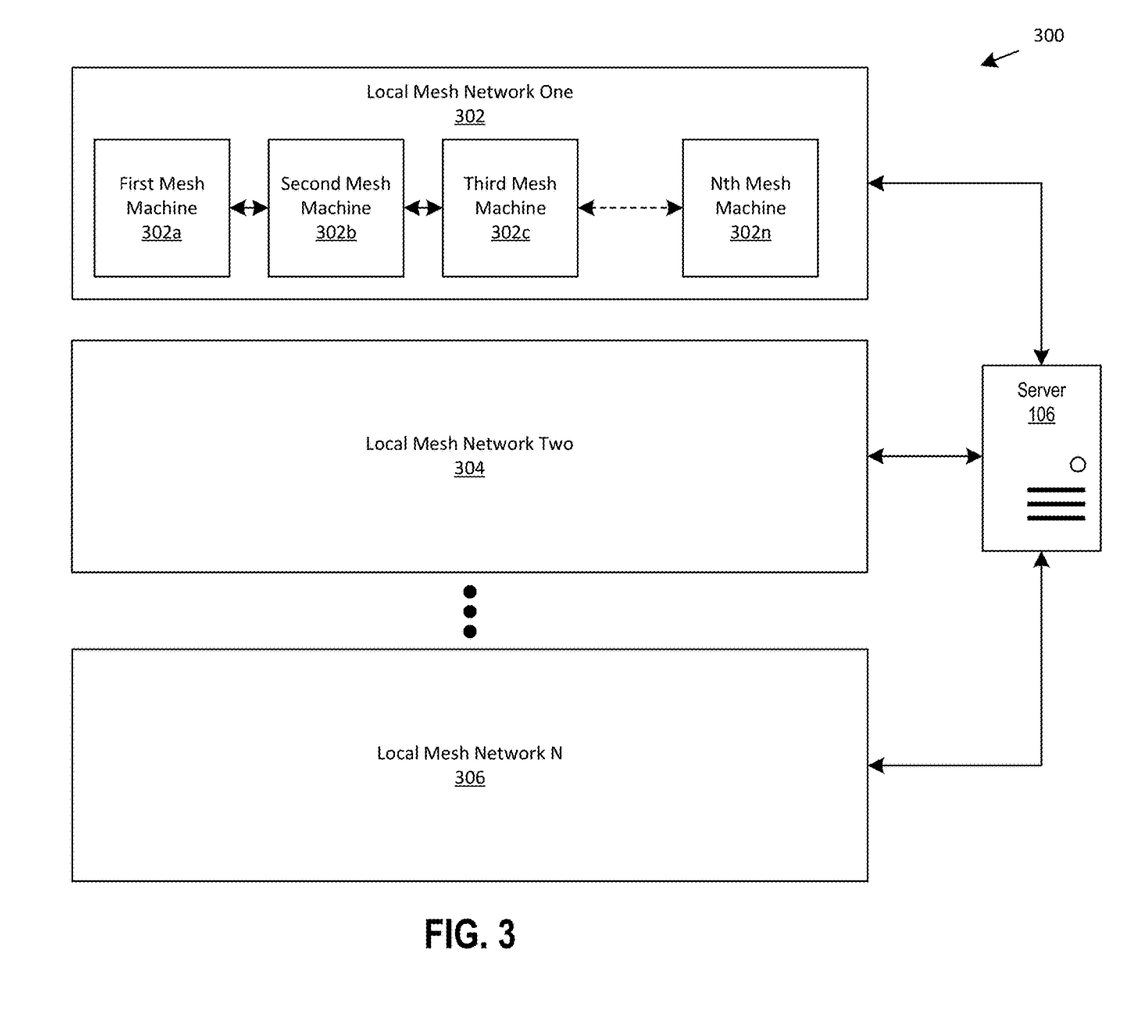
FIG. 3 illustrates a relationship between mesh networks and mesh machines in accordance with some embodiments.

Jumping, momentarily, to FIG. 3 for a more detailed description of the relationship between mesh networks and mesh machines. FIG. 3 illustrates a relationship between local mesh networks and mesh machines in accordance with some embodiments.

It is illustrated that an embodiment may include one or more local mesh networks. Thus, it is illustrated that a local mesh network one 302 may exist. Further, in an embodiment, a local mesh network two 304 may exist. In an embodiment, any number of local mesh networks may exist as represented by mesh network N 306 in the set of local mesh networks one 302 through local mesh network N 306.

Each of the local mesh networks may be communicatively coupled with a server 106. The server allows the local mesh networks to have the capability of communication with one or more of the other local mesh networks that may exist. For example, local mesh network one 302 may be able to send and receive communications to and from local mesh network two 304 through the use of the server 106. The communicative coupling between the server 106 and a local mesh network may be wired (e.g., ethernet) and/or wireless (e.g., cellular, Wi-Fi, etc.).

Further, each of the local mesh networks may contain any number of mesh machines as depicted by local mesh network one 302 having up to an Nth mesh machine 302n. A local mesh network does not exist without at least one mesh machine. Thus, local mesh network two 304 and any number of mesh networks represented by mesh network N 306 would have at least one mesh machine. Further, although an arrow between server 106 and each local mesh network (e.g., local mesh network one 302) is used to illustrate a connection between the server 106 and a local mesh network, the server is communicatively coupled with at least one machine (which may also be referred to as a "node") of the local mesh network. As such, the server 106 is communicatively coupled with a local mesh network via the communication between the server 106 and at least one mesh machine that is within the mesh network. A mesh machine that sends and receives packets to and/or from the server 106 may be referred to as a backhaul node.

As used herein a backhaul node is a type of mesh machine, the backhaul node is a node of a mesh network that is communicatively coupled with the server 106. The backhaul node has one or more communications interfaces that allow it to be communicatively coupled with the server 106. The backhaul node may be communicatively coupled with the server 106 through a wireless and/or wired connection. Further, a backhaul node can communicate with other nodes within its local mesh network using wired and/or wireless communication. A backhaul node may only be able to be communicatively coupled with other nodes that have the same communications interface as the backhaul node (e.g., Bluetooth, Wi-Fi, etc.). A backhaul node may be connected with any other node (e.g., backhaul node, non-backhaul node) that is within a sufficient distance from the backhaul node for communication, is able to communicate using a common communications protocol, is able to send and receive a sufficiently strong signal to and from the backhaul device, is not on a block list from the backhaul node, and/or that is otherwise able to be communicated with. Other nodes within a local mesh network may be capable of operating similarly to a backhaul node but may not have backhaul connection(s) to a server 106 and therefore are not classified as a backhaul node, but rather, classified as a local node.

Looking back to system 100, it is depicted that each mesh machine (e.g., a backhaul node or local node) within each local mesh network has one or more communication interfaces. The communication interfaces of the mesh machines give the mesh machines the capability of communicating with other mesh machines and/or the server 106. In an embodiment, a mesh machine may include a single communications interface as illustrated with the ethernet interface 124 of mesh machine C 130 that is part of the second local mesh network 180. Further, mesh machine C 130 further illustrates that a local mesh network may include a single mesh machine (whether it has backhaul connectivity or not).

In an embodiment, a mesh machine may have more than one communications interface (e.g., mesh machine B 120, mesh machine F 160). A communications interface may give the mesh machine the capability of communicating using one or more protocols and one or more signal types. For example, a communications interface may allow for local communication within a local mesh network (e.g., communication between mesh machine A 110 and mesh machine B 120), such as through the use of Wi-Fi, C-V2X, DSRC, ETSI-G5, Bluetooth, another internet protocol, and/or any other communication protocol.

Further, a communications interface may allow for communication using cellular, satellite, ethernet connectivity, and/or another method of communication. A mesh machine that is capable of establishing a backhaul connection with the server 106 is referred to herein as a backhaul node. In an embodiment, backhaul nodes use one or more methods of communication that allow for long distance communication, such as cellular, satellite, and/or ethernet connectivity. When a mesh machine is capable of communicating with one or more machines that are outside of the local mesh network, such a mesh machine may be referred to as a backhaul node. In an embodiment, a backhaul node is communicatively coupled with the server 106. In an embodiment, a mesh network may include more than one backhaul node, but only one backhaul node may be used to send and receive packets to and from the server 106. In another embodiment, a local mesh network contains more than one backhaul node and more than one backhaul node may be used to send and/or receive packets to and/or from the server 106.

Figure 6:
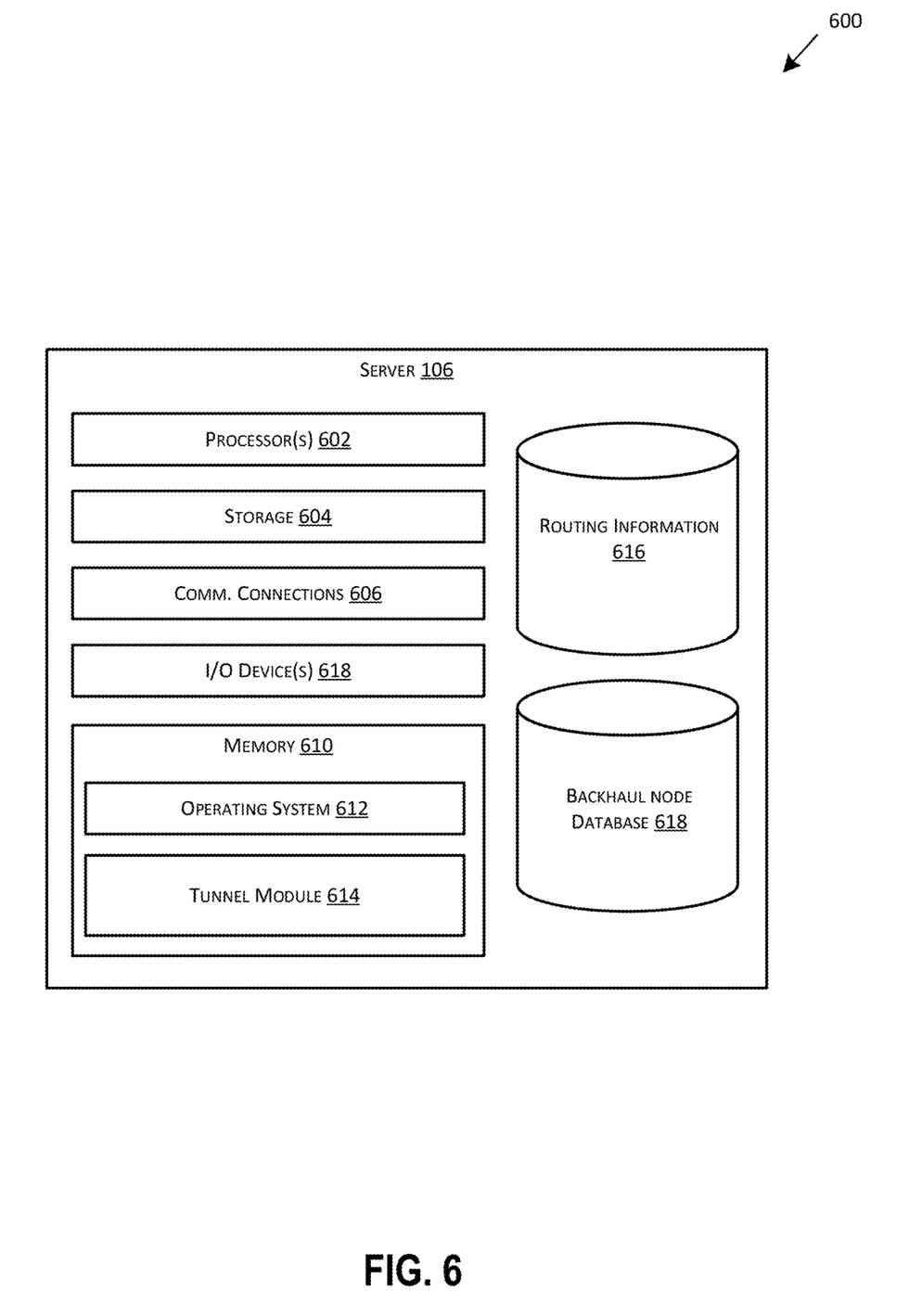
FIG. 6 illustrates a block diagram of a server according to some embodiments.

In an embodiment where a local mesh network contains more than one backhaul node, the backhaul node(s) used to communicate with the server 106 are determined based on a routing protocol. Routing protocols are described in more detail herein and may be based on factors such as physical distance between nodes, hops between nodes, latency, machine characteristics (e.g., whether the machine has certain hardware, is new to the network, is moving at a certain speed, is expected to leave a local mesh network within a set amount of time), bandwidth, administrative controls, packet path weighting values, communications interface being used, etc. Routing protocols are described further in relation to routing information 616 described in system 600. The hybrid mesh network may implement a single common routing protocol, in an embodiment. In an embodiment, the hybrid mesh network is segmented and more than one routing protocol may be implemented (e.g., routing protocol A in a first local mesh network 170 and routing protocol B in a third local mesh network 190).

A mesh machine is a machine that is capable of interfacing with one or more other mesh machines in a local mesh network and/or is capable of communicating with one or more machines (e.g., server 106) outside of the local mesh network that the mesh machine is a part of. For example, mesh machine C may be a desktop computer that is used by a user. Thus, a mesh machine may have one or more user interfaces (e.g., touchscreen, monitor, mouse, keyboard, scanners, sensing devices, etc.) that enable a user to interface with the mesh machine. Further, a mesh machine may be a machine that has local and/or backhaul connectivity and may include a user interface. For example, a mesh machine may be attached to various pieces of equipment (e.g., transport equipment, irrigation pivot, livestock equipment, renewable energy equipment, etc.) that is communicatively coupled with one or more sensing devices (e.g., soil moisture sensor, GPS sensor, pressure sensor, light sensor, acceleration sensor, tilt sensor, flow sensor, vibration sensor, distance sensor, other optical sensors, etc.). Thus, a mesh machine in system 100 represents the broad possibilities of machine embodiments a mesh machine may take. As further examples of mesh machine characteristics, a mesh machine may be stationary, may be moving while in use, etc. A mesh machine may have a battery power source, may be plugged into a wall, may be powered by sunlight, etc. Thus, a mesh machine is a machine that is capable of communicatively coupling with another local mesh machine and/or is capable of backhaul communication and may contain any number of connections to various types of sensing devices.

Additionally, mesh machines within a local mesh network may be in communication with one or more other mesh machines in the local mesh network. System 100 illustrates that the third local mesh network 190 contains mesh machine D 140, mesh machine E 150, and mesh machine F 160. Although each of the machines appears to be connected to each of the other machines in the third local mesh network 190, such a network topology is not required. In an embodiment, mesh machine D 140, mesh machine E 150, and mesh machine F 160, each have a Bluetooth interface 144, 154, and 164, respectively, that they are able to communicate with each other using. Each of the machines in a local mesh network may be capable of communicating with each of the other machines in a local mesh network. For example, each mesh machine may be capable of communicating with all of the other mesh machines because all of the mesh machines are within adequate proximity to the other mesh machines, allowing each of the mesh machines to send and receive messages to and from each of the other mesh machines. In an example, all mesh machines are capable of communicating with all of the other local mesh network mesh machines because each of the machines are within adequate proximity to one another and each mesh machine is capable of communicating via the same communications protocol (e.g., Wi-Fi). In an embodiment, all mesh machines are capable of communicating with all other mesh machines in the same local mesh network but the routing protocol dictates a certain route to be taken (e.g., a direct link is deemed more "costly" than an indirect link).

In an embodiment, a first mesh machine may not be communicatively coupled to one or more other mesh machines that are within the same local mesh network as the first mesh machine (or may not be in communication with any other mesh machine). Such factors that may determine whether a mesh machine is capable of communicating with another mesh machine could be distance, signal strength, communication interface being used, and/or routing protocols. Thus, in an embodiment, mesh machine D may only be within range of mesh machine E, and therefore only able to directly communicate with mesh machine E while not being able to directly communicate with mesh machine F. In such an embodiment, mesh machine F may be within range of mesh machine E and capable of directly communicating with mesh machine E, therefore allowing packets from mesh machine D to traverse through mesh machine E and be forwarded to mesh machine F. The ability of mesh networks to dynamically adapt also allows for mesh machine E to send packets to mesh machine D, to be forwarded from mesh machine D to mesh machine F if mesh machine D becomes closer to mesh machine F, has a stronger signal with mesh machine F, and/or a routing protocol used by the mesh network determines that mesh machine E packets were to be forwarded to mesh machine F by using mesh machine D.

As illustrated in system 100, mesh machine F is not using its Wi-Fi interface to create a communicative coupling with another mesh machine because no other mesh machines within the third local mesh network 190 have the capability of communicating via a Wi-Fi interface. However, if a mesh machine was added into the third local mesh network 190 that only had a Wi-Fi interface, mesh machine F would have the capability of communicating with that fourth machine (and would do so, assuming no other factors prevent the fourth machine from being in communication from mesh machine F, such as distance, signal strength, etc.) but the fourth machine would not be communicatively coupled with any of the other machines in the third local mesh network 190, unless the fourth machine had another interface that was compatible with the interfaces of mesh machine D and mesh machine E. Thus, the topology of a local mesh network is determined by communication interfaces that are available to each mesh machine.

In an embodiment, when a mesh machine has more than one interface, a routing protocol (a set of rules for determining packet routing decisions) may be used to determine which interface is to be used if both of the interfaces could be used to forward a packet to a node in the path for a destination node. The routing protocol may decide which interface to use based on the power required by each available interface that could be used, a configured preference of the mesh machine (either configured by the machine, at the machine by a user, or at another machine by a user (e.g., configurations determined by a user of mesh machine C 130)). In an embodiment, a mesh machine of a local mesh network is capable of having control and thereby may also enable a user to have control over one or more other mesh machines in the same local mesh network or one or more other local mesh networks. For example, a user may use mesh machine C 130 to manage the routing protocols used by other mesh machines and/or local mesh networks. In an embodiment, the first local mesh network 170 may implement different routing protocols than the third local mesh network 190. In an example, mesh machine C 130 may allow for a user to control which mesh machines are able to access the server 106, even if the mesh machine has backhaul connection capabilities. Thus, the server 106 may be configured by a mesh machine to have access controls to ensure the confidentiality, availability, and integrity of data passing through the server.

The server 106 may allow for more than one local mesh network to send packets between the local mesh networks that are communicatively coupled to the server 106. The server 106 may be hosted on a cloud platform. However, the server 106 could be a server running on a machine that is controlled by an entity other than a cloud service provider. The server is described in more detail in relation to FIG. 6.

Embodiments of the present invention may allow for one or more nodes in a first local mesh network to communicate with one or more other nodes outside of the first local mesh network. For example, a mesh machine F 160 may be able to send packets and receive packets to and from mesh machine B 120. Such a capability is useful because it allows mesh machines of different local mesh networks to be in communication with one another when they otherwise may not be able to. Thus, the hybrid mesh network may allow for increased reliability between mesh network nodes, because if one or more of a first set of mesh network nodes becomes unreachable by a second set of mesh network nodes using traditional mesh network communication protocols (e.g., communicating by only using Wi-Fi), a hybrid local mesh network can be created on the fly through the use of backhaul nodes communicating through the use of the server 106, thereby allowing the nodes within the first and second set of mesh network nodes to remain in communication with one another and act as if they were still part of the same local mesh network.

As another example, mesh machine F 160 may be part of a third local mesh network 190 that is in field A of state A while mesh machine B 120 of the first local mesh network 170 may be in field B that is in state B. Assuming field A and field B are not close enough together to be able to be part of the same local mesh network, they would be in two separate local mesh networks and would not be within communication range of communicating with one another using traditional mesh network capabilities. However, by having at least one backhaul node within each of the first local mesh network 170 and the third local mesh network 190, a hybrid mesh network can be formed and allow for mesh machine F 160 and mesh machine B 120 to be in communication with one another no matter the distance as long as each machine is able to be in communication with the server 106 (directly because the machine is a backhaul node and/or because the node has local mesh network connectivity to a backhaul node).

In another example mesh machine F 160 and mesh machine B 120 are relatively close to one another and within the same local mesh network at a first point in time. For example, the two mesh machines may be within the same farming field. In an example, mesh machine F 160 may move over a hill (e.g., mesh machine F 160 is attached to a tractor, embedded within a tractor, etc.). Mesh machine F 160 may still be relatively close to mesh machine B 120 and be within a range that would normally be expected to allow for communication between the two mesh machines, however, the hill may sufficiently obstruct the signal and thereby not allow the mesh machines to continue to directly communicate. However, two separate mesh networks may dynamically form based on certain conditions, such as a signal obstruction. A signal obstruction may occur when an object or land gets between two nodes and therefore causes what would otherwise be one local mesh network to form two separate local mesh networks. In such an example, at a second point in time, on one side of the hill, there may be a third local mesh network 190 with mesh machine F 160, and on the other side of the hill there may now be another local mesh network, the first local mesh network 170 with mesh machine B 120. If each local mesh network has a backhaul node (e.g., mesh machine B 120 is a backhaul node and/or another node communicatively coupled with mesh machine B 120 is a backhaul node), the two local mesh networks could communicate with a server 106, creating a hybrid local mesh network, and thereby still allowing the two local mesh networks to communicate as if they were still apart of the same local mesh network. Thus, reliability of communication between machines of a mesh network is improved.

Figure 2:
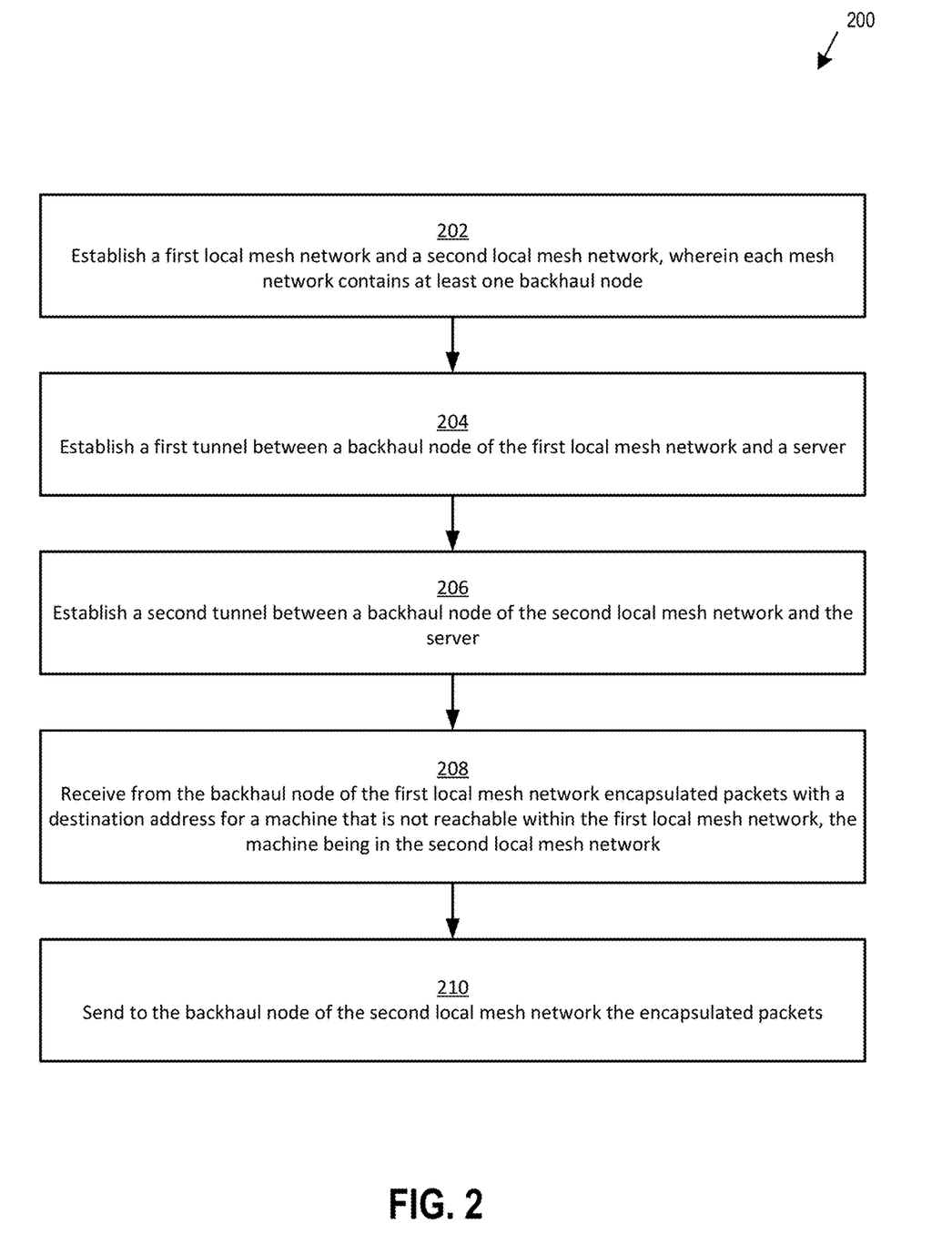
FIG. 2 illustrates an exemplary method embodiment.

FIG. 2 illustrates an exemplary method embodiment. In an embodiment, a method allows for communicating between multiple mesh networks, the mesh networks including one or more nodes with one or more addresses, the method may comprise multiple steps. Such a method may be used for one or more of the examples described above in the discussion of system 100.

At step 202, a first local mesh network and a second local mesh network are established, wherein each of the first and second local mesh networks contain at least on backhaul node.

At step 204, a first tunnel may be established that enables bypassing a firewall, the bypass enabled by encapsulating first packets between a first backhaul node of the first local mesh network and a server, wherein the first backhaul node of the first local mesh network has internet connectivity and receives the first packets addressed to a destination address that is not reachable by the first local mesh network without internet connectivity to a second local mesh network. In an embodiment, the firewall may be implementing a NAT masquerade. In an embodiment, the first backhaul node may receive packets for sending after the first backhaul node has generated packets for sending to a node not within the first local mesh network. In an embodiment, the first backhaul node receives packets from a different node within the first local mesh network that are destined for a node that is outside of the first local mesh network. In an embodiment, tunnels established between one or more local mesh network nodes within one or more local mesh networks and the server are established using a virtual private network (VPN). In an embodiment, encapsulated packets are sent using internet protocol version six or internet protocol version four. In an embodiment, the packets within an encapsulated packet and/or the encapsulated packet itself is encrypted.

In step 206, a second tunnel is established to encapsulate second packets between a second backhaul node of the second local mesh network and the server to enable bypassing the firewall, the bypass enabled by encapsulating second packets between the second backhaul node of the second local mesh network and the server, wherein the second backhaul node of the second local mesh network has internet connectivity and receives the first packets addressed to the destination address that is not reachable by the first local mesh network without internet connectivity to the second local mesh network. In an embodiment, a node of the second local mesh network is not part of the first local mesh network due to network configuration, distance, signal strength, protocols being used, and/or available communications interfaces within nodes of each local mesh network, etc. In an embodiment, the destination address is the backhaul node of the second local mesh network or is another local node without backhaul connectivity but reachable through the backhaul node.

In step 208, the encapsulated first packets from the first backhaul node are received by the server via the first tunnel, wherein the encapsulated first packets include a destination address that belongs to a mesh node in the second local mesh network.

In step 210, responsive to receiving the encapsulated first packets from the first backhaul node: the received encapsulated first packets are transmitted from the server to the second backhaul node of the second local mesh network, wherein the second local mesh network includes the mesh node having an address that corresponds to the destination address of the encapsulated first packets.

Figure 4:
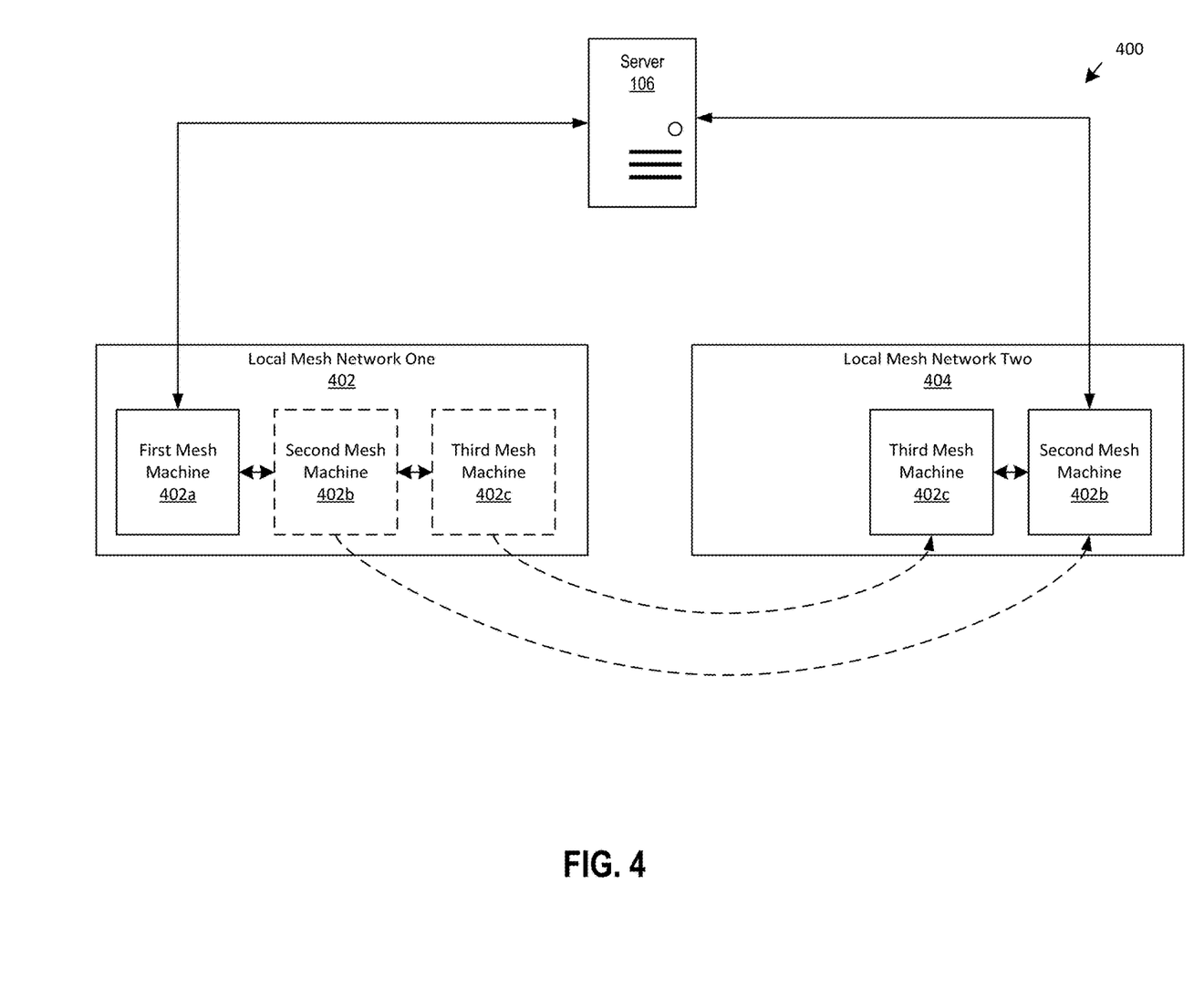
FIG. 4 illustrates a relationship between mesh networks and mesh machines in accordance with some embodiments.

FIG. 4 illustrates a relationship between mesh networks and mesh machines.

System 400 further illustrates that a local mesh network includes one or more mesh machines. System 400 illustrates that a local mesh network one 402 may include a number of mesh machines, wherein the first mesh machine 402*a* is used as a backhaul link to the server and wherein the second mesh machine 402*b* has the capability of establishing a backhaul connection with the server but does not do so. In an embodiment, the second mesh machine 402*b* may not establish a backhaul connection with the server instead of, or in addition to, the first mesh machine 402*a* backhaul node for various reasons, as already described above (e.g., system configurations, routing protocols, connectivity issues, etc.). System 400 illustrates that once the second mesh machine 402*b* and third mesh machine 402*c* establish a mesh network two 404, then the second mesh machine 402*b* is used as a backhaul node, even though it had not been used as one when it was part of the local mesh network one 402. The second mesh machine 402*b* may establish a backhaul link to the server 106 when it is no longer part of the local mesh network one 402 because it has a better connection to the server and/or because there is no other higher priority/preferred backhaul node for connecting to the server 106, etc.

As is further illustrated in system 400, nodes of the local mesh network one 402 are capable of moving out of communication with local mesh network one 402 and establishing their own local mesh network two 404 that still has the capability of communicating with the one or more nodes (e.g., first mesh machine 402*a*) of local mesh network one 404 through establishing a backhaul connection with the server 106 and encapsulating packets to be sent to the server 106 and then to the local mesh network one 402, thereby creating a hybrid mesh network where the mesh machines within each respective local mesh network still behave as if they were part of the same original local mesh network where they did not need to communicate using the server 106.

Figure 5:
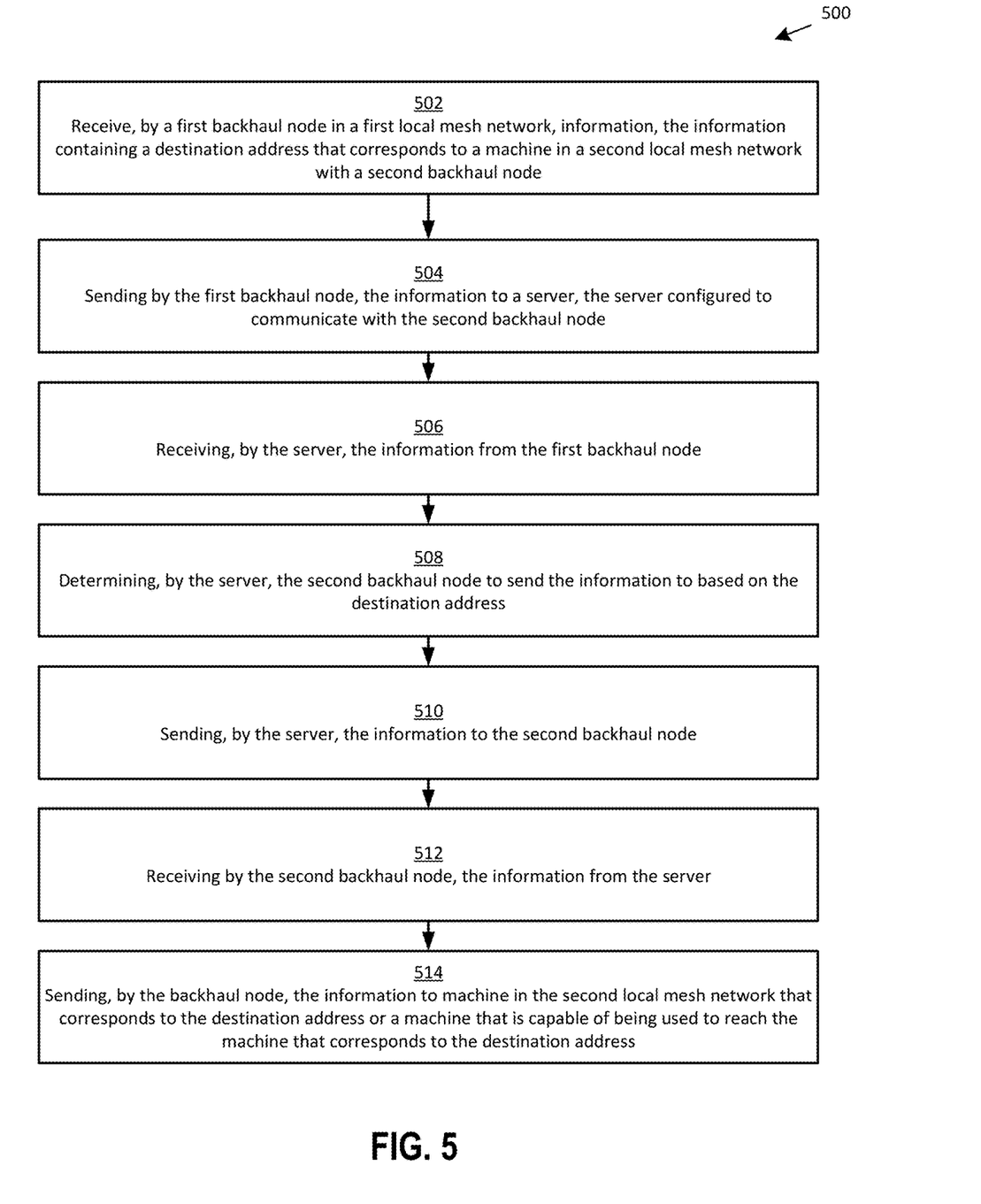
FIG. 5 illustrates an exemplary data flow embodiment from a first mesh network to a second mesh network.

FIG. 5 illustrates an exemplary data flow from a first mesh network to a second mesh network. Data flow 500 may act as an example of a situation where a first backhaul node and second backhaul node are each part of separate and distinct local mesh networks where either the respective backhaul nodes and/or another node within the respective local mesh networks are sending and/or receiving packets to and/or from the other local mesh network.

In step 502, a first backhaul node in a first local mesh network receives information, the information containing a destination address that corresponds to a machine in a second local mesh network, the second local mesh network including a second backhaul node. In an embodiment, the machine in the second local mesh network is a backhaul node of the second local mesh network. In an embodiment, the machine in the second local mesh network is a node other than a node with backhaul capabilities in the second local mesh network. In an embodiment, the first local mesh network and/or the second local mesh network may contain one or more backhaul nodes and zero or more nodes that are not backhaul nodes. In an embodiment, a local mesh network may contain zero backhaul nodes and one or more local nodes. In such an example embodiment, one or more local nodes may store information for communicating once one or more nodes becomes part of a local mesh network with new nodes. In the example embodiment, once one or more nodes become part of the local mesh network, the new node(s) may be a backhaul node and/or a local node. The new node may therefore be the intended final destination or be me able to be used to forward the packet to the intended final destination address. Further, in such an example embodiment, the one or more local nodes storing information may retain the information for some duration of time before the information is deleted and/or overwritten.

In an embodiment, the first backhaul node in the first local mesh network receives information from a system running locally on the backhaul node and/or receives information from a separate node in the first local mesh network.

In step 504, the first backhaul node of the first local mesh network sends the information to a server, the server configured to communicate with the second backhaul node. In an embodiment, the server has more than one communications interface and therefore is able to communicate with a first backhaul node that uses a first type of communications interface and communicate with a second backhaul node that uses a second type of communications interface. In an embodiment, the server is in periodic communication with one or more backhaul nodes. Such periodic information may be useful for monitoring connectivity to respective backhaul nodes and/or for monitoring changes in the hybrid mesh network topology and the topology of the local mesh networks. In an embodiment, the server shares collected network information with one or more local mesh networks. The collected network information may contain network topology information, device location information, backhaul nodes that are online (able to communicate with the server). In an embodiment, the collected network information is generated by the server and then sent to one or more backhaul nodes in one or more local mesh networks.

In step 506, the server receives the information from the first backhaul node. The information is included within an encapsulated packet.

In step 508, the server determines a second backhaul node to send the information to based on the destination address of the encapsulated packet.

In step 510, the server sends the information to the second backhaul node. The information is included within an encapsulated packet.

In step 512, the second backhaul node receives the information from the server.

In step 514, the backhaul node sends the information to a machine in the second local mesh network that corresponds to the destination address or the machine that is capable of being used to reach the machine that corresponds to the destination address. Thus, in an embodiment, the backhaul node corresponds to the destination address and therefore the backhaul node is the final recipient of the encapsulated information. That is to say, the encapsulated packet will not be forwarded to another machine within the second local mesh network because the backhaul node is the final destination of the packet. In an embodiment, the packet contained within the encapsulated packet is forwarded to another node in the second local mesh network that either corresponds to the destination address for the packet or is in a determined path toward the node with the destination address.

FIG. 6 illustrates a block diagram of a server according to some embodiments.

The server 106 may be any type of computing device configured to perform at least a portion of the functionality described herein. In some embodiments, the server 106 may be executed by one more virtual machines (e.g., virtual server(s)) implemented in a hosted computing environment. Thus, in some embodiments, a server may be a virtual server. The hosted computing environment may include one or more rapidly provisioned and released computing resources, which computing resources may include computing, networking, and/or storage devices. A hosted computing environment may also be referred to as a cloud-computing environment and/or a cloud platform.

In one illustrative configuration, the server 106 may include at least one memory 610 and one or more processing units (or processor(s)) 602. The processor(s) 602 may be implemented as appropriate in hardware, computer-executable instructions, firmware or combinations thereof. Computer-executable instruction or firmware implementations of the processor(s) 602 may include computer-executable or machine executable instructions written in any suitable programming language to perform the various functions described. The server 106 may also include additional storage 604.

The memory 610 may store program instructions that are loadable and executable on the processor(s) 602, as well as data generated during the execution of these programs. Depending on the configuration and type of server 106, the memory 610 may be volatile (such as random access memory (RAM)) and/or non-volatile (such as read-only memory (ROM), flash memory, etc.). The server 106 may also include additional storage 604, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 610 may include multiple different types of memory, such as static random access memory (SRAM), dynamic random access memory (DRAM) or ROM. Turning to the contents of the memory 610 in more detail, the memory 610 may include an operating system 612 and one or more application programs or services for implementing the features disclosed herein including at least a module for establishing tunnels (tunnel module 614) with backhaul nodes so encapsulated packets may be sent between one or more backhaul nodes and the server 106.

In an embodiment, the memory 610 may retain encapsulated packets that were not able to be sent to a respective local mesh network. As an example, encapsulated packets may not be sent to a respective local mesh network because the server may not know where the destination node is located (e.g., routing tables need to be updated), the backhaul node that corresponds to the local mesh network where the encapsulated packet is to be sent has gone offline (e.g., the backhaul node has been powered down, has lost signal), and/or the destination node may be a node of which does not have backhaul connectivity and is not located within a local mesh network that contains a backhaul node (and is therefore not part of the hybrid mesh network). Thus, such packets that are not able to be sent may be retained by the server for a predefined period of time (e.g., 5 seconds, 2 minutes, 30 minutes, etc.) and/or may be retained by the server based on a dynamic determination (e.g., if a destination path was known within the past 2 minutes, the packet information will be retained by the server for longer than if the destination node had never been known to the server).

The memory 610 may also include routing information 616. The routing information may be used to determine the most appropriate path for forwarding data packets from their source to their destination across a network and may be in the form of a routing table. Routing tables are a set of rules used to make decisions regarding where to send packets based on the destination IP address associated with a packet. Routing tables may include a list of network destinations and associated attributes (e.g., next hop node, interface to use for forwarding the packets, cost/weight value associated with the path, and/or any other administrative rules, etc.). The server may be configured to use the routing information to determine the best path for forwarding each packet that is received from a backhaul node. In an embodiment, the routing protocol used by the server and/or other nodes within respective local mesh networks is Open Shortest Path First, Border Gateway Protocol, Routing Information Protocol, enhanced interior gateway routing protocol, Intermediate System to Intermediate System protocol, Ad-hoc On-demand Distance Vector routing, and/or another routing protocol. In an embodiment, the routing protocol used by a local mesh network is different than the routing protocol used by another local mesh network and/or the server.

In an embodiment where a dynamic routing protocol is used by the server and/or one or more local mesh networks, the capability to dynamically update allows the server and/or nodes of local mesh networks to adapt to changing circumstances, such as link failures, network congestion, and/or changes in network topology, so that packets may be routed according to an optimized path. In an embodiment, cost/weight values associated with links is determined by the type of routing interface being used (e.g., an ethernet link may have a more preferable weight than a cellular link, a Wi-Fi link may be weighted more preferably than a Bluetooth link, etc.). Thus, as an example, in an embodiment, if node A is able to communicate with node B using Wi-Fi or Bluetooth, weighting for the communication link may determine that the Wi-Fi connection is used (e.g., possibly due to more data throughput).

The memory 610 may also include a backhaul node database 618. The backhaul node database may store a list of information (e.g., addresses) associated with respective backhaul nodes. In an embodiment, the server only sends and/or receives encapsulated packets with backhaul nodes that are indicated for communicating with the server by the backhaul node database. Thus, in an embodiment, a server is configured to communicate with a subset of backhaul nodes that could otherwise be communicated with. Such configurations may be managed by one or more users (e.g., server administrator, users of backhaul nodes).

The memory 610 and the additional storage 604, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed from the server 106. The server 106 may also contain communications connection(s) 606 that allow the server 106 to communicate with a stored database, a mesh machine (e.g., backhaul node), another server, user terminals, and/or other components of the described system. The server 106 may also include input/output (I/O) device(s) and/or ports 608, such as for enabling connection with a keyboard, a mouse, a pen, a voice input device, a touch input device, a display, speakers, a printer, etc.

The server 106 may communicate with one or more mesh machines (e.g., backhaul nodes) over a communication network. In some embodiments, the communication network may include any one or a combination of many different types of networks, such as cable networks, the Internet, wireless networks, cellular networks, and other private and/or public networks. In addition, the communication network may comprise multiple different networks. For example, a mesh machine may utilize a cellular network to communicate with a cell tower, which may then route the communication over an ethernet network connection to the server 106.

Below are some additional examples of how a hybrid mesh network may be useful.

In an example, a local mesh network exists between various machines attached to farming equipment and includes ten mesh machines. In such an example, five mesh machines may only be able to communicate with a different five mesh machines using two common nodes, allowing communication within an original local mesh network of the ten nodes (e.g., nodes 1, 2, 3, and 4 in communication with node 5, node 5 in communication with node 6, node 6 in communication with nodes 7, 8, 9, and 10). However, if the two common nodes (nodes 5 and 6, for example) are no longer able to communicate with one another, a hybrid mesh network can be created between each set of five nodes to allow the ten total nodes to still behave and communicate as if they were still a part of the original local mesh network of ten nodes, even once the original local mesh network of ten nodes is broken into two separate and distinct local mesh networks of five nodes as long as each local mesh network has at least one backhaul node and the nodes are able to communicate among one another within each local mesh network using one or more communication interfaces associated with each respective node.

In such an example, the original local mesh network may be broken into two local mesh networks because a piece of farming equipment with a mesh machine that was acting as node 5 of the mesh network moved out of range of mesh machine node 6. Further, the original local mesh network may be broken into two local mesh networks because a piece of machinery or building has obstructed the signals between nodes 5 and 6.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A computer-implemented method for communicating between multiple mesh networks, the mesh networks including one or more nodes with one or more addresses, the method comprising:

establishing a first tunnel, that enables bypassing a firewall, the bypass enabled by encapsulating first packets between a first backhaul node of a first local mesh network and a server, wherein the first backhaul node of the first local mesh network has internet connectivity and receives the first packets addressed to a destination address that is not reachable by the first local mesh network without internet connectivity to a second local mesh network;
responsive to a second backhaul node moving out of wireless communication range of the first local mesh network, establishing a second tunnel to encapsulate second packets between the second backhaul node of the second local mesh network and the server to enable bypassing the firewall, the bypass enabled by encapsulating second packets between the second backhaul node of the second local mesh network and the server, wherein the second backhaul node of the second local mesh network has internet connectivity and receives the first packets addressed to the destination address that is not reachable by the first local mesh network without internet connectivity to the second local mesh network;
receiving at the server the encapsulated first packets from the first backhaul node via the first tunnel, wherein the encapsulated first packets include the destination address that belongs to a mesh node in the second local mesh network; and
responsive to receiving the encapsulated first packets from the first backhaul node:
transmitting from the server the received encapsulated first packets to the second backhaul node of the second local mesh network, wherein the second local mesh network includes the mesh node having an address that corresponds to the destination address of the encapsulated first packets.

2. The method of claim 1, wherein at least one of the first tunnel and the second tunnel is established with a VPN.

3. The method of claim 1, wherein the first backhaul node and the second backhaul node have at least one of cellular, satellite, or ethernet connectivity.

4. The method of claim 1, wherein the first local mesh network and the second local mesh network comprise a set of machines, the set of machines including one or more machines capable of wired or wireless communication.

5. The method of claim 4, wherein a machine in the set of machines includes at least one of: a user interface, or a communicative coupling to one or more sensing devices.

6. The method of claim 1, wherein the second backhaul node communicates with the server via the first backhaul node while the second backhaul node is included in the first local mesh network based at least in part on one of: a configuration, a routing protocol, or a connection status.

7. The method of claim 1, wherein the first backhaul node and the second backhaul node send at least one of the encapsulated first packets or the encapsulated second packets using internet protocol version six or internet protocol version four.

8. A system for communicating between multiple mesh networks, the system comprising:
a first backhaul node;
a second backhaul node; and
a server configured to:
establish a first tunnel, that enables bypassing a firewall, the bypass enabled by encapsulating first packets between the first backhaul node of a first local mesh network and the server, wherein the first backhaul node of the first local mesh network has internet connectivity;
responsive to the second backhaul node moving out of wireless communication range of the first local mesh network, establishing a second tunnel to encapsulate second packets between the second backhaul node of a second local mesh network and the server to enable bypassing the firewall, the bypass enabled by encapsulating second packets between the second backhaul node of the second local mesh network and the server, wherein the second backhaul node of the second local mesh network has internet connectivity;
receive encapsulated packets from the first backhaul node in the first local mesh network; and
transmit, the received encapsulated packets to the second backhaul node.

9. The system of claim 8, wherein the server is configured to receive the encapsulated packets from the first backhaul node that is part of the first local mesh network and the first local mesh network includes one or more machines.

10. The system of claim 8, wherein the encapsulated packets are encrypted.

11. The system of claim 8, wherein the firewall implements a NAT masquerade.

12. The system of claim 8, wherein the first local mesh network and the second local mesh network comprise a set of machines, the set of machines including one or more machines capable of wired or wireless communication, and wherein a machine in the set of machines includes at least one of: a user interface, or a communicative coupling to one or more sensing devices.

13. The system of claim 8, wherein the first local mesh network sends packets locally over any internet protocol based mesh network, including but not limited to: Wi-Fi, C-V2X, DSRC, ETSI-G5, or Bluetooth.

14. The system of claim 8, wherein at least one of the first backhaul node and the second backhaul node is configured to send the encapsulated packets using internet protocol version six or internet protocol version four.

15. A non-transitory processor-readable storage medium, comprising processor-readable instructions configured to cause one or more processors to:
establish a first tunnel, that enables bypassing a firewall, the bypass enabled by encapsulating packets between a first backhaul node of a first local mesh network and a server, wherein the first backhaul node of the first local mesh network has internet connectivity and receives one or more packets addressed to a destination address that is not reachable by the first local mesh network without internet connectivity to a second local mesh network;
responsive to a second backhaul node moving out of wireless communication range of the first local mesh network, establish a second tunnel to encapsulate packets between the second backhaul node of the second local mesh network and the server to enable bypassing the firewall, the bypass enabled by encapsulating packets between the second backhaul node of the second local mesh network and the server, wherein the second backhaul node of the second local mesh network has internet connectivity and receives one or more packets addressed to the destination address that is not reachable by the first local mesh network without internet connectivity to the second local mesh network;
receive encapsulated packets from the first backhaul node via the first tunnel, wherein the encapsulated packets include the destination address that belongs to a mesh node in the second local mesh network; and responsive to receiving the encapsulated packets from the first backhaul node:
 transmit the received encapsulated packets to the second backhaul node of the second local mesh network, wherein the second local mesh network includes a node with an address that corresponds to the destination address of the encapsulated packets.

16. The non-transitory processor-readable storage medium of claim 15, wherein the encapsulated packets are encrypted.

17. The non-transitory processor-readable storage medium of claim 15, wherein the first backhaul node and the second backhaul node have at least one of cellular, satellite, or ethernet connectivity.

18. The non-transitory processor-readable storage medium of claim 15, wherein the first and second local mesh networks are made up of one or more machines capable of wired or wireless communication.

19. The non-transitory processor-readable storage medium of claim 15, wherein the first local mesh network sends packets locally over an internet protocol based mesh network.

20. The non-transitory processor-readable storage medium of claim 15, wherein the second backhaul node communicates with the server via the first backhaul node while the second backhaul node is included in the first local mesh network based at least in part on a routing protocol.

* * * * *